Patented Jan. 3, 1939

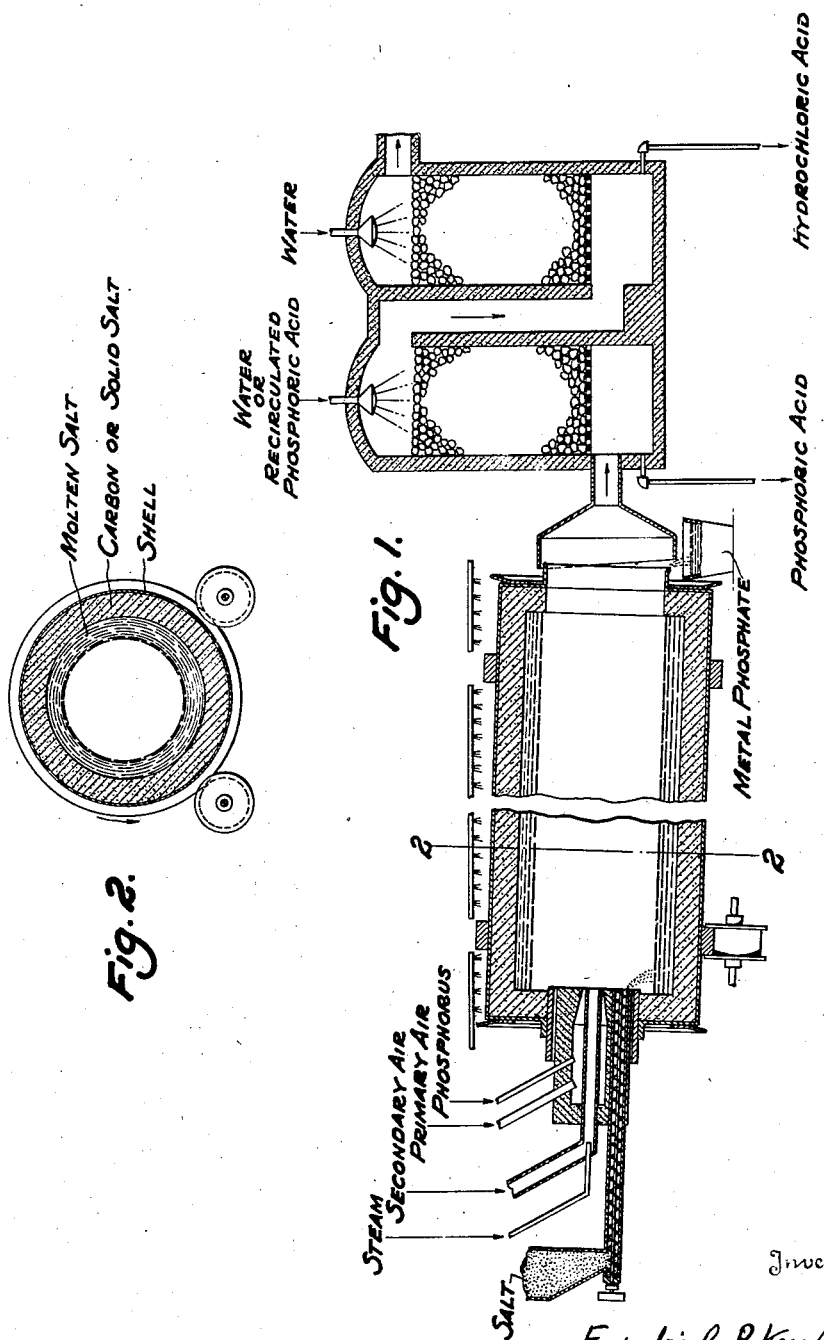

2,142,943

UNITED STATES PATENT OFFICE 2,142,943

PRODUCTION OF PHOSPHATE SALTS

Friedrich P. Kerschbaum, Winter Haven, Fla., assignor to Harold T. Stowell, Washington, D. C.

Application May 21, 1937, Serial No. 143,995

9 Claims. (Cl. 23—106)

This invention relates to the production of salts of phosphoric acid and is particularly directed to the production of metal phosphates by the reaction of the products of combustion of phosphorus with metal compounds, particularly salts having volatilizable anions.

It has been proposed to react the oxidation products of phosphorus with alkali and alkaline earth metal salts, but a number of difficulties have stood in the way of the utilization of such a process. One of the most serious of these difficulties is the apparent impossibility of finding materials of construction which will withstand the combined effect of the highly oxidizing conditions, the high temperatures and the extremely corrosive nature of the reactants and the products of the reaction at the temperatures necessarily employed.

In my application Serial No. 105,605, filed October 14, 1936, I have described a method and apparatus for carrying out the reaction of phosphorus oxidation products with alkali metal chlorides wherein the reaction is caused to take place in a space surrounded by a solid shell of alkali metal phosphate.

The process described in that application consists essentially in that the reaction which is to bring about the formation of the desired phosphorus salt, for example, from the components P2O5 and an alkali carrier with a volatilizable ion, for example, sodium chloride, is effected in the interior of an externally cooled metallic rotating drum, the inner surface of which has previously been covered with a suitable more or less thick solid layer of the desired reaction product of its intermediates. The heating of such a rotary drum is advantageously effected by the heat developed in the combustion of elementary phosphorus with oxygen-containing gases such as air, which may be preheated or enriched in oxygen whereby P2O5 is formed which is absorbed more or less completely in the molten contents of the rotary drum. The continually maintained external cooling of the rotary drum results in the solid salt lining being prevented from melting through to the metallic shell of the drum under the effect of the hot combustion flame or gases and in maintaining it continuously as a solid shell which effectively protects the metallic drum from the chemical attack of the molten phosphorus salt and the gases. The relatively slow rotation of the drum, together with the continual external cooling, brings about that the gradual melting portion of the solid salt lining under the effect of the hot gases is continuously replaced by solidifying salt from the pool of molten material in the lower part of the drum. By this means there is produced by the use of the solid salt lining a completely uncorrodible reaction chamber which can be used for the chemical reaction between corrosive gases and molten phosphorus salts, for example, reacting according to the following equations:

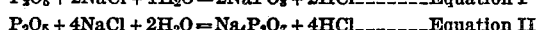
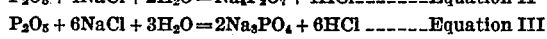

$P_2O_5 + 2NaCl + 1H_2O = 2NaPO_3 + 2HCl$ _____Equation I $P_2O_5 + 4NaCl + 2H_2O = Na_4P_2O_7 + 4HCl$ _____Equation II $P_2O_5 + 6NaCl + 3H_2O = 2Na_3PO_4 + 6HCl$ _____Equation III with a phosphorus combustion flame as a source of heat. The mechanism of the reaction is probably that $P_2O_5$ and $H_2O$ react to form $HPO_3$ in the gaseous phase, and $P_2O_5$ and $HPO_3$ are absorbed at the surface of the molten material and react in the interior of the melt with the alkali carrier. The reaction is more complete according to Equation I than with Equations II and III.

As the heat of combustion of the amount of phosphorus used under the thermal conditions of a rotary drum with a solid salt lining is insufficient to carry the desired reactions to completion, the reaction can be completed by the supply of further heat either by auxiliary heating in the rotary furnace or more advantageously, as a separate operation by subsequently heating the reaction products of the reaction which only incompletely took place in the drum. The combustion of gaseous phosphorus mixed with CO as obtained from an electric furnace or blast furnace phosphorus process can also be regarded as auxiliary heating.

In a rotary drum with a solid salt lining the reaction $H_3PO_4 + NaCl = NaPO_3 + H_2O + HCl$ can also be carried out if an external source of heat such as oil is used, for example, when a by-product phosphorus acid is to be utilized. The thermal conditions, however, are rather unsatisfactory in this case.

For economic reasons the four following conditions should be simultaneously fulfilled for the technical operation of the desired reactions on a large scale:

(1) That the amount of heat utilized for the reaction should be limited to the heat of combustion of elementary phosphorus in the amounts corresponding to the $P_2O_5$ components of reactions I, II and III.

(2) That only air, preferably not preheated, should be used as a source of oxygen rather than oxygen or oxygen enriched air.

(3) That a process should be carried out completely in continuous concurrent or countercurrent flow (of $P_2O_5$ to NaCl, for example) so that a thermic after-treatment with an additional supply of heat (for driving out the last portion of chlorine) should not be required.

(4) That the absorption of $P_2O_5$ should be substantially complete or at least relatively high.

The amount of heat produced by the combustion in air of the amount of phosphorus necessary for metaphosphate is sufficient for the production of a practically completely chlorine-free (containing less than 0.1%) hexametaphosphate in a rotating drum lined with solid metaphosphate and having, for example, the following dimensions: diameter 20 inches, length 7 feet for the iron drum, rotating at about 5 to 15 R. P. M. and supplied with 15 to 30 pounds of phosphorus per hour. In this operation, however, a substantial portion of the $P_2O_5$ passes out unabsorbed, for example, about one-third, and must be separately recovered as phosphoric acid.

It is not, however, possible to obtain in this way a product containing substantially more $Na_2O$ than metaphosphate within the limiting conditions 1 to 4, that is to effectuate reactions II and III; the goal is not attained since with increased addition of NaCl the reaction remains incomplete and the elimination of chlorine is insufficient.

The reason for this is that while in carrying out reaction I, that is, the production of metaphosphate in continual operation, the heat losses of the rotating drum with its solid salt lining are very high, but the heat utilized in the drum in spite of the loss is sufficient for completion of the reaction according to Equation I. In attempting to carry out Equations II and III on the other hand, it has been found that the heat losses through the solid salt layer are too great. The available heat in the interior of the drum no longer suffices for the complete formation of the pyro or orthophosphate.

The cause of this high heat loss is that the thickness of the solid phosphorus salt lining of the rotary drum in equilibrium condition under continuous operation cannot be made great enough to provide a good heat insulating layer. Because of the necessary equilibrium between the amount of heat absorbed by the inner surface of the solid salt layer and the removal of heat through solid salt layer and the drum wall, for example, by cooling water, the thickness of the layer is automatically determined. With thermal equilibrium, the amount of heat supplied to the inner surface of the solid salt layer and the amount of heat carried away from that surface must be equal. The heat flux, that is, the amount of calories per surface and time unit given up to the cooling water is, however, determined by the heat conductivity and the thickness of the solid salt layer. This heat conductivity is a constant of the material. There is, therefore in regions of high heat supply to the solid salt layer (in the neighborhood of the phosphorus flame) a greater melting than in regions of lower heat supply until a thermal equilibrium is attained throughout the lining. In this way there results a pear-shaped cavity such as shown in the drawing of U. S. application Serial No. 105,605. The sources of the greatest heat loss are the thinnest portions of the salt lining, that is, the regions nearest the phosphorus flame. The large heat losses are thus understandable: solid metaphosphate, as well as its components is, at the existing temperatures, a relatively easily melting material and also of higher heat conductivity than the usual ceramic materials. Its heat insulating effect can therefore not be very substantial, although it is sufficient, as stated, for the formation of metaphosphate. It is not possible in continuous operation to provide the wall lining for pyrophosphate production from the higher melting pyrophosphate because the liquid salt in the interior of the drum in mixture with its components, particularly NaCl, dissolves in the pyro lining and replaces it by a solidified mass of the melt itself and thus lowers its melting point.

The high heat losses of the rotating drum with a solid salt lining have, as has already been pointed out, the further disadvantage that the rotating drum cannot be made sufficiently large and particularly not sufficiently long to attain a complete absorption of the $P_2O_5$ from the phosphorus combustion in the interior of the drum. In the production of metaphosphate with solid salt linings almost ½ to ⅓ of the $P_2O_5$ produced is lost in the exit gas. An enlargement or a lengthening of the rotary drum leads to a solidification of its molten content, that is, to a loss of capacity to absorb $P_2O_5$. Only the pool of molten material and the thin layer of the melt which wets the solid salt lining can readily absorb $P_2O_5$.

It has now been found that the inevitable disadvantage of the above-described method of working, namely, the high heat loss from the interior of the rotary drum through the solid salt lining, together with its undesired consequence, the loss of $P_2O_5$, can be avoided without any loss in resistance to corrosion by operating according to a different principle.

The new process comprises using the molten reaction product or its components in the liquid condition as the lining of the reaction chamber. This liquid lining is formed by the use of a suitable vessel rotating at a sufficiently high speed, for example, a horizontal drum or a vertical crucible of suitable material which is provided with the necessary amount of molten salt. Such a vessel at suitable velocities of rotation carries the molten salt with it by friction and spreads it out over its inner wall by centrifugal force so that it is entirely coated with the molten salt.

The use of centrifugal force to form layers of molten materials has been applied in the process of centrifugal casting of metal objects, particularly cast-iron pipes. Similarly to the molten metals, molten salts can also be handled by centrifugal force in spite of their lower specific gravity (2.0 to 2.5 according to temperature) in comparison with molten metals (about 6.0). The speed of rotation for cylindrical hollow shells, for example, which are to be provided with molten salt lining is substantially dependent only on the inner diameter to be provided with a molten layer. This amounts for a desired inner diameter of a molten salt layer of 1 foot to about 78 R. P. M., for a diameter of 2 feet to about 57 R. P. M., for a diameter of about 3 feet to about 42 R. P. M. In practice with phosphorus salts, velocities of rotation somewhat higher, say 20 to 100%, are used in order to obtain a strong retention of the molten salt on the shell and a better spreading out.

From the above-stated velocities, it is apparent that for such rotating drums practical speeds of rotation of about one revolution per second are involved and that these velocities become smaller with increasing diameter of the drum. The velocities given above also make it clear that there is here involved quite different and much lower range of velocities than is required in centrifuges for separation of liquid or liquid-solid mixtures. The speed of rotation of such a rotating drum is only about 1/20 to 1/100 of that of centrifuges.

This new application of centrifugal force to liquid molten phosphorus salts also makes it possible to protect the shell of the rotating drum which supports the molten salt layer from the effect of corrosive gases in the interior of the drum.

In addition it has been found that such molten salt layers spread out by centrifugal force are effective in heat insulating.

This was not to be expected of molten layers, for the convective movements made possible by the liquid condition of such a layer especially with the relatively low viscosities of molten phosphorus salts, would suggest that the heat flux through such a layer would be very considerable because of convection. The existence of a substantial heat absorption in such layers indicates, however, that although convective currents exist in such a liquid layer, nevertheless they are not of substantial importance for their thermal properties. Also the effect of the convective currents can be reduced by increasing the speed of rotation. Therefore rotating molten layers of phosphorus salts may be built up to any desired thickness and used for heat insulation.

In this way the double purpose of the present invention is attained. The rotating liquid layer protects the supporting shell from the effect of corrosive gases in the interior and prevents undesirably large heat losses through the wall of the shell. For the practical construction of such rotating drums it is now only necessary to solve the problem of providing a resistant support for the rotating molten phosphorus salt. This is readily provided, for example, by the use of graphite as a construction material or by the use of solid masses of phosphorus salts according to the process of U. S. application Serial No. 105,605. Carbon in the form of graphite or carbon blocks is here particularly useful because as stated carbon is resistant to the corrosive action of phosphorus salts. To be sure its temperature must not go substantially above about 1000° C. in order to avoid the reducing effect on the phosphorus salt.

In the interior of such rotating drums with liquid phosphorus salt linings all reactions between corrosive gases and liquid phosphorus salts can be carried out at any desired temperature level in a simple manner. One can therefore, in the production of metaphosphates according to Equation I, obtain practically complete absorption of $P_2O_5$ from the phosphorus combustion, and also, by increasing the temperature level in consequence of the reduction in heat loss, carry out the reactions according to Equations II and III. The heat loss of such rotating drums can be kept very small so that chemical reactions can be carried out in which elementary phosphorus or the $P_2O_5$ obtained therefrom are not reaction components and the heat of combustion of phosphorus is therefore not available so that a further heat source such, for example, as an oil burner or an electrical resistance heater, is required.

The accompanying drawings show apparatus suitable for use in practicing the process of the invention:

Fig. 1 is a sectional representation of apparatus embodying the principles of the invention and having a molten salt lining supported on a carbon or solid salt lining with provision for external cooling;

Fig. 2 is a section on line 2—2 of Fig. 1;

Figure 3:
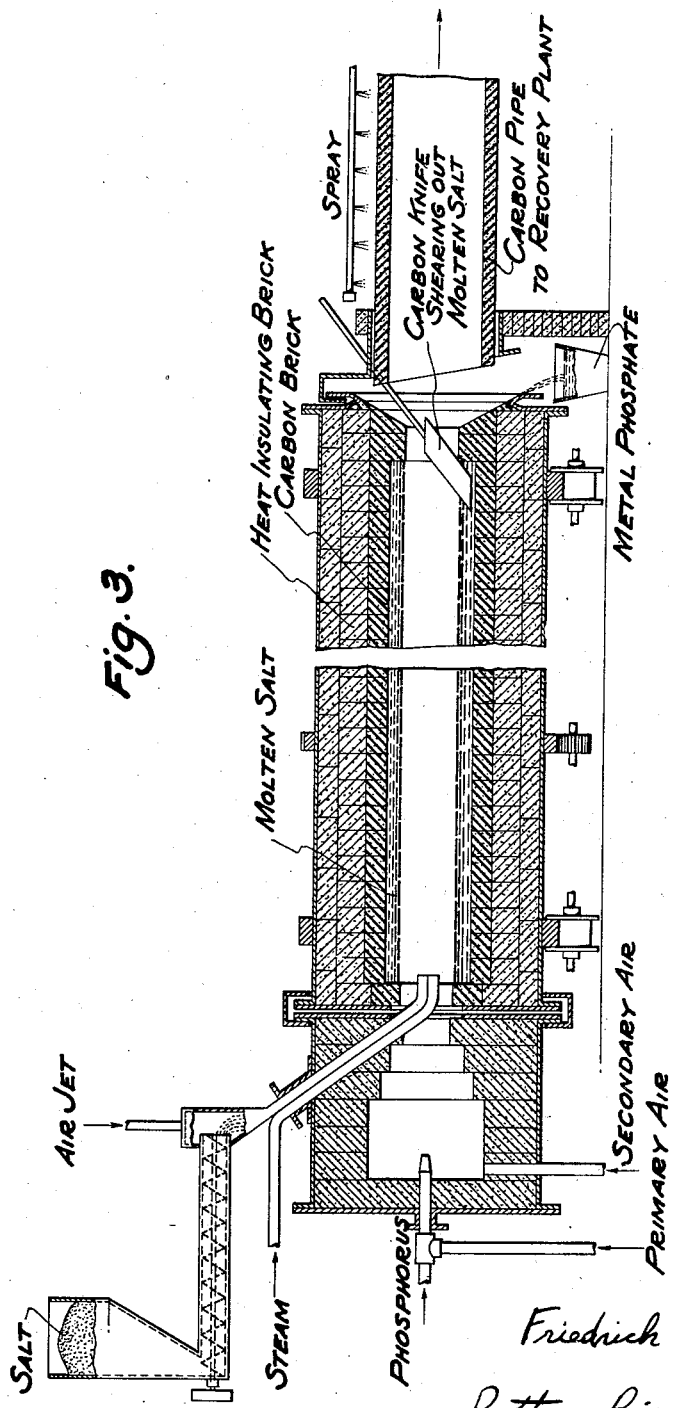
Fig. 3 is a sectional representation of another form of apparatus embodying the principles of the invention having a molten salt lining supported on a layer of carbon brick with an insulating brick backing.

In the following a number of examples are given of the manner in which the process of the invention can be operated:

*Example 1*

Sodium hexametaphosphate is produced from elementary phosphorus by combustion of phosphorus in air with recovery of at least 90% of the phosphorus as metaphosphate using steam and sodium chloride as a source of alkali. The metaphosphate is to be free from chlorine (less than 0.1% Cl) and the process is to be operated concurrently or countercurrently. The apparatus consists of a drum as described in U. S. application Serial No. 105,605 but of approximately twice the length possible in the process described therein and arranged for rotation as a rotary drum at about 10 R. P. M. and also, at will, for rotation as a centrifugal drum at about 100 R. P. M. (according to the diameter of the drum). For providing the drum with a solid phosphorus salt lining, metaphosphate is melted at slow speed with the aid of a powerful oil burner alternately from each end of the drum while rotating the drum. Under the effect of the continual external cooling by water, there is formed a solid salt layer and upon it a pool of molten phosphorus salt. As soon as this stage is reached the rotation is increased to "centrifugal" speed. The liquid pool immediately disappears. A liquid lining forms on a crust of solid phosphorus salt maintained by the external cooling. So much phosphorus salt is melted that the liquid layer is about two to four inches thick. Thereupon the introduction of elementary phosphorus to the burner instead of oil is commenced and the corresponding supply of steam and salt is begun. As soon as the centrifugal drum thus formed comes into thermal equilibrium under the effect of the hot phosphorus flame almost complete absorption of the $P_2O_5$ (over 90%) in the interior of the drum takes place. With countercurrent operation outflowing metaphosphate produced is already completely chlorine free, and when working in concurrent it has a slight residual content of chlorine or HCl which, however, during the outflowing of the hot melt is given up to the surrounding atmosphere.

*Example 2*

Neutral sodium pyrophosphate is to be produced. According to Equation II for the same amount of phosphorus and therefore the same amount of heat as in Example 1, twice as much sodium chloride must be reacted. Advantageously there is used in this operation a considerable excess of steam, for example, 5 to 10 times the theory. The absorption of $P_2O_5$ should amount to 80 to 90% since the exit gases of the process must be worked up to HCl and $H_3PO_4$. The operation is in countercurrent.

Since sodium pyrophosphate melts at 957° C. the temperature of the melt in the interior of the drum must be kept at 970 to 980° C. At such a high temperature level the heat insulation obtained by a solid phosphorus salt layer is not sufficient to carry the reaction to an end. The method must therefore be operated in accordance with the present invention, that is, with a molten liquid phosphorus salt lining.

(a) One can provide as a support for the liquid layer a solid phosphorus salt layer by suitable external cooling of the centrifugal drum and limit the heat loss of such a drum by regulating the thickness of the liquid layer by increased speed of rotation so that the heat loss remains within desired limits.

(b) Or the formation of a solid phosphorus salt layer may be eliminated and no external cooling of the drum provided. For this purpose the shell of the drum is first given an outer coating of a heat insulating material such as a ceramic material and the interior provided with a lining of carbon blocks. For drum of small dimensions a graphite tube imbedded in a heat insulating layer can also be utilized. After supplying an amount of molten phosphorus salt sufficient for completely covering the interior of the drum, the centrifugal drum is ready for operation. In this example, as in Example 1, the heat source is a phosphorus flame in the interior of the drum. By controlling the supply of air and the supply of steam it is possible to keep the temperature at the boundary between the carbon and the molten phosphorus salt at not over 1000 to 1100°. In this way the range of phosphorus salt reduction by carbon is avoided. In this method of operation the phosphorus salt layer produced by centrifugal force acts in the first instance as a protective layer for the carbon lining against the attack of the corrosive gases in the interior of the drum and secondarily as a heat insulator. Substantial heat insulation is provided by the carbon lining and the outer covering of the drum. In this way it is possible to reduce the heat loss in such a centrifugal drum to 10% or less of the amount of heat developed by the combustion of phosphorus. The result is a complete carrying out of the desired reaction. Any desired degree of $P_2O_5$ absorption in the drum can be obtained by suitable choice of length of the drum for danger of freezing up is very slight.

*Example 3*

A mixture of tri-potassium orthophosphate and potassium chloride (suitable as a conversion mixture for treating phosphate rock) is to be produced. The reaction takes place according to Equation III. Operation is carried out concurrently since the elimination of residual chlorine is not involved. Since the eutectic melting point of a mixture of $K_3PO_4$ and KCl is about 720° C., the choice of a supporting material for the liquid phosphorus salt layer produced by centrifugal force is not in itself difficult. There is here advantageously used as in Example 2 (b) an uncooled drum with carbon block lining which reduces the heat loss of the drum to practically nil. For carrying out the reaction of Equation III and particularly in concurrent, it is desirable to maintain the concentration of the HCl in the gaseous atmosphere in the interior of the drum small. This is effected by increasing the excess of air in the phosphorus combustion which dilutes the HCl containing gases in the drum. Since in this case it is not desirable to work with phosphorus flame temperatures (of about 2500° C.) in the interior of the drum because the mixture to be produced melts at about 720° C. and also because the choice of drum dimensions and particularly the drum length is substantially unrestricted because of the good heat insulation of the centrifugal drum, it is not necessary to produce the desired $P_2O_5$ component by the combustion of phosphorus in the interior of the centrifugal drum. Preferably the phosphorus combustion is carried out in a stationary chamber ahead of the centrifugal drum and the $P_2O_5$ containing gases are passed into the interior of the centrifugal drum at a temperature of about 1600°. The stationary chamber for the phosphorus combustion may be constructed of known heat resistant and $P_2O_5$ resistant ceramic material having a softening point of 1700° C. and higher. The temperature of the phosphorus combustion gases is lowered from about 2500 to 1600° by supplying excess air to the phosphorus burner. Moreover, since preheated air is not used for the combustion, the air stream may be supplied to the stationary combustion chamber through tangential openings and thus be utilized for cooling the ceramic material of which the chamber is constructed. The increase in the excess of air in addition to lowering the temperature of the phosphorus flame as stated, facilitates the course of the reaction in the interior of the drum.

*Example 4*

Neutral potassium pyrophosphate is to be produced from phosphorus and KCl as components with phosphorus combustion in air and operation in countercurrent. The reaction takes place according to Equation II. Since the melting point of neutral potassium pyrophosphate is 1090° C. the melt in the interior of the centrifugal drum must be maintained at at least 1100° C. The phosphorus flame burns in the interior of the centrifugal drum and the liquid lining is maintained thicker than in the preceding examples, for example, about 5 inches or more. The liquid layer is carried on a carbon lining of a graphite tube or with greater dimensions, carbon blocks. The covering of the carbon wall with thermal insulation material or supporting material is not complete but is interrupted or checkered. The metal outer wall of the drum is likewise not continuous but suitably pierced so that the air currents created by the rotation of the drum or, if desired, by forced drafts, maintain the temperature of the inner surface of the carbon lining in contact with the molten phosphorus salt below the reduction temperature of the phosphorus salt, that is about 1000 to 1100°. A certain heat loss in this drum must be taken into consideration and has the advantage that the molten phosphorus salt in the interior of the drum can be maintained at a temperature not substantially higher than the carbon wall.

*Example 5*

A mixture of neutral potassium pyrophosphate and potassium chloride with a eutectic melting point of about 735° C. at 15 molecular per cent KCl content is to be produced from potassium metaphosphate and KCl (in excess) with air as a source of oxygen and electrical energy as a source of heat. The chlorine gas produced is likewise to be utilized.

The reaction takes place according to the equation $2KPO_3 + 2KCl + \frac{1}{2}O_2 = Cl_2 + K_4P_2O_7$. The centrifugal drum for this reaction is constructed for the insulation of heat. The graphite layer for supporting the molten phosphorus salt lining is utilized for the electrical heating of the drum. Sliding contacts conduct the electrical current to the graphite lining. The electrical development of heat must be regulated so that the temperature of the liquid phosphorus salt does not exceed 1000° or thereabout because of the danger of reduction. This condition is readily fulfilled without lowering the temperature of the molten phosphorus salt so much that the speed of reaction becomes undesirably small.

Together with the desired phosphorus salt a completely dry highly concentrated chlorine gas is obtained which by the use of oxygen enriched air or gaseous oxygen itself can be made as high as 100% chlorine. Such chlorine is particularly suitable for liquefaction.

*Example 6*

Highly concentrated aqueous phosphoric acid of about 56% $P_2O_5$ content such as is obtained as recovered acid in crude oil refining is to be converted by reaction with KCl and steam, using an oil burner as a heat source, into a eutectic mixture of KCl and $K_3PO_4$ with a melting point of 720° C. at 15 molecular per cent KCl content with recovery of the hydrochloric acid produced. The operation is conducted continuously in countercurrent.

The apparatus is a centrifugal drum which can be constructed with a solid salt lining or completely heat insulated with a carbon lining according to whether the fuel oil is cheap or expensive. Aqueous phosphoric acid wets all surfaces including also carbon surfaces with which it comes in contact. However, as soon as the water content is driven out and the phosphorus salt formation begins the wetting stops and centrifugal force must be made use of for protection against corrosion and for heat insulation.

Impurities in the phosphoric acid of organic material and oil residues do not cause trouble as they are burned up in the drum. Inorganic impurities do not cause any difficulty when the salt mixture produced is to be used for the treatment of phosphate rock for fertilizer purposes.

The two last examples show that the principle of the centrifugal drum for the production of molten phosphorus salts is quite independent of the use of elementary phosphorus.

The molten products of the reactions described may be removed from the drum in a number of ways. The exit opening of the drum may be made of a diameter equal to the smallest internal diameter of the molten salt lining at its desired thickness. In this case the molten product will flow out of the exit opening at a point where the lining is at its maximum thickness, which will vary somewhat with the speed of rotation and the viscosity of the molten material. Excess molten product may also be scraped or sheared out of the drum, for example, by means of a carbon plough or knife extending into the interior of the drum through the exit opening. It is also possible to remove excess product by periodically slowing down the drum and allowing a portion of the molten material, which then collects in a pool at the bottom of the drum, to run out.

It will thus be seen that the invention provides a novel means for carrying out chemical reactions between corrosive gases and molten salts which require a reaction space resistant to corrosion at high temperatures, by lining the reaction space with a layer of molten salt formed by centrifugal force in a rotating supporting shell. It it particularly advantageous for the production of metal phosphates which may be melted at temperatures not greatly exceeding 1500° C., such as sodium, potassium, calcium, magnesium, zinc, lead and the like.

I claim:
1. A method of producing salts of phosphorus which comprises maintaining by centrifugal force a continuous cylindrical liquid layer of the molten phosphate salt to be produced upon a rotating supporting shell not subject to attack by the molten salt, supplying to the space confined by said cylindrical layer, at a temperature above the melting point of said salt, oxidation products of phosphorus and a metal salt having an anion volatilizable by reaction with said oxidation products, and reacting the same therein to form a phosphate salt.

2. A method of producing salts of phosphorus which comprises maintaining by centrifugal force a continuous cylindrical liquid layer of the molten phosphate salt to be produced upon a rotating supporting shell not subject to attack by the molten salt, supplying to the space confined by said cylindrical layer, at a temperature above the melting point of said salt, oxidation products of phosphorus and a compound of a metal of the group consisting of alkali and alkaline earth metals capable of reacting with said oxidation products to form a phosphate salt, and reacting the same therein to form a phosphate salt.

3. A method of producing salts of phosphorus which comprises maintaining by centrifugal force a continuous cylindrical liquid layer of the molten phosphate salt to be produced upon a rotating supporting shell not subject to attack by the molten salt, supplying to the space confined by said cylindrical layer, at a temperature above the melting point of said salt, oxidation products of phosphorus and an alkali metal chloride, and reacting the same therein to form a phosphate salt.

4. A method of producing salts of phosphorus which comprises maintaining by centrifugal force a continuous cylindrical liquid layer of the molten phosphate salt to be produced upon a rotating supporting shell not subject to attack by the molten salt, establishing an incandescent combustion zone in the space confined by said cylindrical layer, supplying to said combustion zone oxidation products of phosphorus and a metal salt having an anion volatilizable by reaction with said oxidation products, and reacting the same therein to form a phosphate salt.

5. A method of producing salts of phosphorus which comprises maintaining by centrifugal force a continuous cylindrical liquid layer of the molten phosphate salt to be produced upon a rotating supporting shell not subject to attack by the molten salt, establishing an incandescent combustion zone in the space confined by said cylindrical layer, supplying to said combustion zone oxidation products of phosphorus and a compound of a metal of the group consisting of alkali and alkaline earth metals capable of reacting with said oxidation products to form a phosphate salt, and reacting the same therein to form a phosphate salt.

6. A method of producing salts of phosphorus which comprises maintaining by centrifugal force a continuous cylindrical liquid layer of the molten phosphate salt to be produced upon a rotating supporting shell not subject to attack by the molten salt, establishing an incandescent combustion zone in the space confined by said cylindrical layer, supplying to said combustion zone oxidation products of phosphorus and an alkali metal chloride, and reacting the same therein to form a phosphate salt.

7. A method of producing salts of phosphorus which comprises maintaining by centrifugal force a continuous cylindrical layer of the molten phosphate salt to be produced upon a rotating supporting shell not subject to attack by the molten salt, oxidizing elemental phosphorus in the space confined by said cylindrical layer to form an incandescent combustion zone, supplying to said combustion zone a metal salt having an anion volatilizable by reaction with oxidation products of phosphorus, and reacting the same therein to form a phosphate salt.

8. A method of producing salts of phosphorus which comprises maintaining by centrifugal force a continuous cylindrical layer of the molten phosphate salt to be produced upon a rotating supporting shell not subject to attack by the molten salt, oxidizing elemental phosphorus in the space confined by said cylindrical layer to form an incandescent combustion zone, supplying to said combustion zone a compound of a metal of the group consisting of alkali and alkaline earth metals capable of reacting with oxidation products of phosphorus to form a phosphate salt, and reacting the same therein to form a phosphate salt.

9. A method of producing salts of phosphorus which comprises maintaining by centrifugal force a continuous cylindrical layer of the molten phosphate salt to be produced upon a rotating supporting shell not subject to attack by the molten salt, oxidizing elemental phosphorus in the space confined by said cylindrical layer to form an incandescent combustion zone, supplying to said combustion zone an alkali metal chloride, and reacting the same therein to form a phosphate salt.

FRIEDRICH P. KERSCHBAUM.